(No Model.)

S. GRIMSTAD.
COMPOSITE MATERIAL FOR MOLDINGS, &c., AND METHOD OF MAKING SAME.

No. 510,855.                               Patented Dec. 12, 1893.

Witnesses.
C. E. Tomlinson
Samuel Kid

Inventor.
Soren Grimstad.
by Dayton Pooler Brown
his Atty.s

THE NATIONAL LITHOGRAPHING COMPANY,
WASHINGTON, D. C.

UNITED STATES PATENT OFFICE.

SOREN GRIMSTAD, OF CHICAGO, ILLINOIS.

COMPOSITE MATERIAL FOR MOLDINGS, &c., AND METHOD OF MAKING SAME.

SPECIFICATION forming part of Letters Patent No. 510,855, dated December 12, 1893.

Application filed April 19, 1892. Serial No. 429,728. (No specimens.)

*To all whom it may concern:*

Be it known that I, SOREN GRIMSTAD, of Chicago, in the county of Cook and State of Illinois, have invented certain new and useful Improvements in Composite Material for Moldings, &c., and Methods of Making the Same; and I do hereby declare that the following is a full, clear, and exact description thereof, reference being had to the accompanying drawings, and to the letters of reference marked thereon, which form a part of this specification.

My invention relates to composite materials for picture-frames, furniture, cabinet-work, and similar work, and more particularly to such composite materials as are formed of layers of veneer glued together and presenting an ornamental appearance by virtue of their different colors and grainings.

The primary object of my invention is to produce a composite material which shall be strong and durable in construction, and in which the attractive effects due to differences in color of the veneers shall be enhanced by the presence of varied forms of portions originally severed from the composite material and transposed thereon.

To the above purposes, my invention consists, first, in certain peculiar and novel features of construction and arrangement, as hereinafter described and claimed, and, secondly, in a peculiar and novel method of producing the composite material, also as hereinafter described and claimed.

The more precise nature of my invention will be better understood when described with reference to the accompanying drawings, in which—

Figure 1:
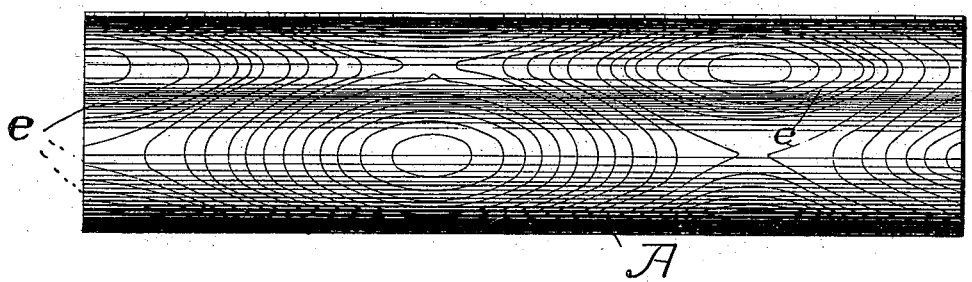
Figure 2:
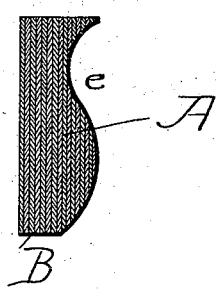
Figure 3:
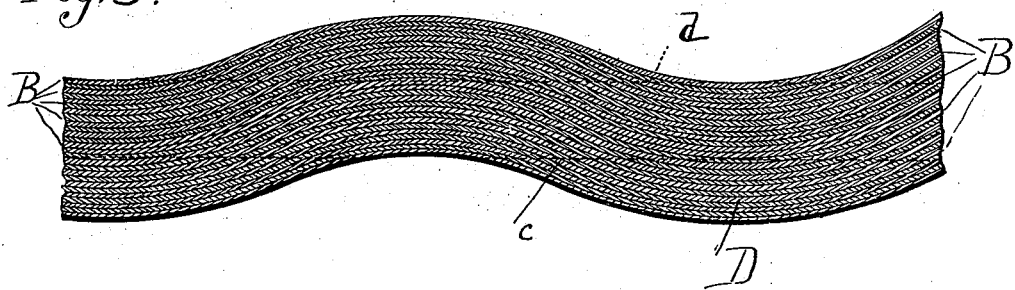

Figure 1 is an edge view of a piece of composite material embodying my invention. Fig. 2 is a plan view of a piece of molding made of the composite material embodying my invention. Fig. 3 is an end view of the piece of molding shown in Fig. 2.

Previous to my present invention composite materials for picture-frames, furniture, cabinet-work, &c., have been produced by uniting layers of veneer of different grains, or colors, so as to produce attractive effects from the contrasts or blendings of colors and grainings, and these attractive effects have also been enhanced by bending the layers into curved forms.

In accordance with my present invention, I proceed much further than heretofore, and after having bent the united layers of veneers, so as to form alternate elevations and depressions upon the opposite surfaces of the material, I sever the elevated portions from one side or face of the material, transpose them to the opposite side of the material, and glue or otherwise secure them to the depressed portions of the opposite side of the material. By virtue of this method, I secure not only an enhanced attractiveness of material due to the contrasts and blending of the different colors of veneers, but also the presence of varied outlines of the transposed sections.

Referring to the drawings, A designates the material as a whole, this material being composed of a number of layers B of veneer of different color (either natural or artificial) and also of different grainings, if desired; the said layers being glued or otherwise closely united together. The material thus formed is bent, either by steaming or otherwise, so as to impart a waved form to the edges of the layers, and so also as to produce alternate elevations D and depressions d upon the two opposite sides of the material. After the material has been thus bent, the elevations D are sawed off from one side of the material so as to leave such side straight, and the convex surfaces of the severed elevations are fitted into concave portions of the opposite side of the material and are united therein by gluing. Thus both sides of the material become straight, while the surface to which the severed elevations have been affixed is variegated not only in color but also by the outlines of the attached portions, for example as at e in Fig. 2. The transposition of the severed elevations D also pleasingly distorts the edges of the layers, and the material thus formed may be worked into moldings such as are shown in Figs. 2 and 3, or it may be used in making furniture, cabinet-work, and the like.

Having thus described my invention, what

I claim as new therein, and desire to secure by Letters Patent, is—

1. A composite material composed of united layers of veneer bent into waved form so as to produce alternate surface elevations and depressions and having the severed elevations of one surface transposed to the opposite surface and secured in the depressions of the latter, substantially as set forth.

2. A method of making a composite material, the method consisting of uniting layers of veneer in such manner as to produce alternate elevations and depressions upon the opposite surfaces of the material, then severing the elevations from one surface and securing them within the depressions of the opposite surface, substantially as set forth.

In testimony that I claim the foregoing as my invention I affix my signature in presence of two witnesses.

SOREN GRIMSTAD.

Witnesses:
   TAYLOR E. BROWN,
   G. W. HIGGINS, Jr.